US009206334B2

(12) United States Patent
Bühne et al.

(10) Patent No.: US 9,206,334 B2
(45) Date of Patent: Dec. 8, 2015

(54) COATING PREPARATION CONTAINING UREA COMPONENTS AND AMIDE COMPONENTS

(75) Inventors: Sylvia Bühne, Duisburg (DE); Jürgen Omeis, Dorsten-Lembeck (DE); Daniela Leutfeld, Wesel (DE); Marc Eberhardt, Wesel (DE); Berthold Jacobs, Reken (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 13/520,419

(22) PCT Filed: Jan. 28, 2010

(86) PCT No.: PCT/EP2010/000505
§ 371 (c)(1),
(2), (4) Date: Jul. 31, 2012

(87) PCT Pub. No.: WO2011/091812
PCT Pub. Date: Aug. 4, 2011

(65) Prior Publication Data
US 2012/0289635 A1 Nov. 15, 2012

(51) Int. Cl.
*C08G 18/08* (2006.01)
*C08K 5/16* (2006.01)
*C08G 18/28* (2006.01)
*C08K 5/00* (2006.01)
*C09D 177/06* (2006.01)
*C08G 18/32* (2006.01)
*C08G 18/62* (2006.01)
*C08G 18/72* (2006.01)
*C08G 18/76* (2006.01)
*C09D 175/02* (2006.01)
*C09D 175/04* (2006.01)
*C09D 177/00* (2006.01)
*C08L 75/02* (2006.01)
*C08L 77/06* (2006.01)

(52) U.S. Cl.
CPC ............ *C09D 177/06* (2013.01); *C08G 18/283* (2013.01); *C08G 18/324* (2013.01); *C08G 18/6229* (2013.01); *C08G 18/722* (2013.01); *C08G 18/7621* (2013.01); *C09D 175/02* (2013.01); *C09D 175/04* (2013.01); *C09D 177/00* (2013.01); *C08L 75/02* (2013.01); *C08L 77/06* (2013.01)

(58) Field of Classification Search
USPC .......................... 524/186, 195, 211, 589, 607
See application file for complete search history.

(56) References Cited

U.S. PATENT DOCUMENTS

| 4,383,068 | A | * | 5/1983 | Brandt ........................ 524/196 |
| 5,349,011 | A | | 9/1994 | Reichert et al. |
| 6,420,466 | B1 | | 7/2002 | Haubennestel et al. |
| 6,617,468 | B2 | * | 9/2003 | Haubennestel et al. ........ 560/25 |
| 6,686,412 | B1 | | 2/2004 | Berschel et al. |
| 7,655,815 | B2 | | 2/2010 | Haubennestel et al. |
| 2006/0155020 | A1 | * | 7/2006 | Lenges et al. ................. 524/186 |
| 2007/0225451 | A1 | | 9/2007 | Haubennestel et al. |

FOREIGN PATENT DOCUMENTS

| CA | 2352660 C | | 10/2008 |
| EP | 0 528 363 A2 | | 2/1993 |
| EP | 1 048 681 A2 | | 11/2000 |
| EP | 1 188 779 A1 | | 3/2002 |
| EP | 1 832 573 A2 | | 9/2007 |
| GB | 2177411 A | * | 1/1987 |
| JP | 2002020682 A | | 1/2002 |
| JP | 2002542367 A | | 12/2002 |

OTHER PUBLICATIONS

PCT/EP2010/000505—Written Opinion of the International Searching Authority, Sep. 20, 2010.
PCT/EP2010/000505—International Search Report, Sep. 20, 2010.
PCT/EP2010/000505—International Preliminary Report on Patentability, Feb. 2, 2012.

* cited by examiner

*Primary Examiner* — Aiqun Li
(74) *Attorney, Agent, or Firm* — Curatolo Sidoti Co., LPA; Joseph G. Curatolo; Salvatore A. Sidoti

(57) ABSTRACT

The invention relates to a coating preparation containing
i) 0.1 to 9.0 wt % a urea component (A),
ii) 0.1 to 5.0 wt % an amide component (B),
iii) 10.0 to 90.0 wt % a binding agent component (C) that is different from both the urea component (A) and the amide component (B), and
iv) 0 to 85.0 wt % a solvent component (D),
wherein the sum of the urea component (A) and amide component (B) fractions is 0.3 to 10.0 wt % and the sum of the binding component (C) and solvent component (D) fractions is 80.0 to 99.7 wt %.

18 Claims, No Drawings

COATING PREPARATION CONTAINING UREA COMPONENTS AND AMIDE COMPONENTS

The invention relates to a coating preparation and a coated substrate.

Rheology control agents having various chemical bases are used for controlling the rheology of coating agents. Known rheology control agents include organically modified bentonites, silicic acids, hydrogenated castor oil and polyamide waxes. These substances are primarily dry solid substances, which must be solubilized by means of solvents and shear forces to produce a semifinished product and/or must be introduced into the liquid coating system by selective temperature control. If appropriate temperatures are not maintained, crystallites will emerge in the finished coating system, which can result in defects in the coating. For example, EP-A 1 832 573 describes biuret-containing polyamides, which are used in dissolved form as liquid rheology control agents for coating agents. When polyamides or oligoamides are used as rheology control agents in a coating agent, this formulation exhibits various disadvantages in terms of application: As the temperature increases, an increasingly diminishing efficacy is observed. Thus, for example, the sedimentation of pigments in a finished coating preparation when this coating preparation is exposed to high temperatures during storage cannot be prevented. The coating preparation also cannot be prevented from sagging when it is applied under elevated environmental temperatures or to hot substrates. Moreover, a sagging of the coating material, and therefore curtaining, is observed when the coating preparation is thermally cured or forced-air dried.

The problem addressed by the present invention was therefore that of providing coating preparations which do not exhibit the above-mentioned disadvantages.

This problem is solved by a coating preparation containing
  i) 0.1 to 9.0 wt % a urea component (A),
  ii) 0.1 to 5.0 wt % an amide component (B),
  iii) 10.0 to 90.0 wt % a binding agent component (C) that is different from both the urea component (A) and the amide component (B), and
  iv) 0 to 85.0 wt % a solvent component (D),
wherein the sum of the urea component (A) and amide component (B) fractions is 0.3 to 10.0 wt % and the sum of the binding component (C) and solvent component (D) fractions is 80.0 to 99.7 wt %.

The urea component (A) consists of compounds, each of which contains at least one urea group and fewer than two amide bonds, to the nitrogen atom of each of which at least one hydrogen atom is bonded.

The amide component (B) is composed of compounds, each of which has at least two amide bonds, to the nitrogen atom of each of which at least one hydrogen atom is bonded. According to the invention, therefore, no species of compounds that have only one amide bond per molecule are to be included in amide component (B). It can further be stated that such compounds are ordinarily significantly less efficacious (as compared with compounds having at least two amide bonds each).

The binding agent component (C) is composed of nonvolatile inorganic and/or preferably organic compounds, each of which is suitable as a binding agent for coatings. By definition, compounds to be included in the urea component (A) or the amide component (B) should not be considered as compounds of the binding agent component (C).

The solvent component (D) consists of solvents that are volatile under drying and curing conditions for coatings, which are each suitable for use as solvents for coatings. Compounds that belong to the urea component (A) or the amide component (B) or the binding agent component (C) cannot be included in the solvent component (D).

The coating preparation according to the invention exhibits clear advantages in terms of application in relation to known coating preparations, with said advantages being reported particularly even at elevated temperatures. In this connection, the following are particularly to be emphasized: the particularly high compatibility of the two contained rheology control agents (A) and (B) in varnishes, the improvement in sagging behavior of the coating preparation during coating, the positive results with respect to gloss and/or haze of the resulting coating, and an improvement of the stability in storage of the coating preparation, which is observed particularly when pigments and filler materials are contained. Obviously, these positive effects are induced particularly by the appropriate combination of components (A) and (B).

In a preferred embodiment of the invention, the sum of the urea component (A) and amide component (B) fractions is 0.4 to 6 wt %, preferably 0.5 to 2.0 wt %, and the sum of the binding agent component (C) and solvent component (D) fractions is 85.0 to 99.5 wt %, preferably 90.0 to 99.5 wt %.

In most cases, amide component (B) is present in the form of compounds (B'), each of which has a molecular weight of 300 to 50,000 and has 2 to 300 amide groups, with the proviso that the percentage by weight of each of the heteroatoms contained in the amide groups, referred to the molecular weight of the respective compound (B'), is 0.2 to 25.0% (sum of the atomic weights of the relevant heteroatoms referred to the molecular weight), and at least one hydrogen atom is bonded to each of the nitrogen atoms of the amide groups.

Heteroatoms are to be understood as atoms that are not present as carbon or hydrogen.

With respect to the method for determining molecular weight that is to be used (particularly for the compounds (B') and for the compounds (A') mentioned below), the following is to be specified: The molecular weight is determined by means of gel permeation chromatography (GPC)—according to DIN 55672 Part 2 (as the eluent, a solution of lithium bromide (concentration 5 g/L) in dimethylacetamide is used. For calibration, narrowly dispersed, linearly structured polymethylmethacrylate standards having molecular weights of between 1000000 and 102 are used. The temperature of the overall GPC system (injector, sample plate, detectors and columns) is 80° C.).

Frequently, each of the compounds (B') has a molecular weight of 300 to 30,000 and has 2 to 150 amide groups, with the proviso that the percentage by weight of each of the heteroatoms contained in the amide groups, referred to the molecular weight of the respective compounds (B'), amounts to 2 to 20% (sum of the atomic weights of the relevant heteroatoms referred to the molecular weight), and in each case at least one hydrogen atom is bonded to the nitrogen atoms of the amide groups.

The amide groups of the compounds B' can be obtained, for example, by condensing carboxylic acids, preferably monoor dicarboxylic acids and/or dicarboxylic acid anhydrides with amines, preferably mono- or diamines, according to customary methods (known to a person skilled in the art), in such a way that at least two amide groups form per molecule. The amines are preferably aliphatic, aromatic and araliphatic primary amines, such as ethylenediamine, neopentanediamine, 1,2- and 1,3-propanediamine, 1,6-hexamethylenediamine, 1,8-octamethylenediamine, 1,10-decamethylenediamine, 1,12-dodecamethylenediamine, cyclohexyldiamine, 4,4'-diaminodicyclohexylmethane, 3,3'-dimethyl-4,4'-diaminodicyclohexylmethane, isophoronediamine, 4,7-dioxadecan-1,10-diamine, 4,7,10-trioxadecan-1,12-diamine, polyoxyalkylenediamines, which contain ethylene oxide groups and/or propylene oxide groups, arranged randomly or in blocks (known from Huntsman, for example, under the trade names Jeffamin D 230, D 400, D 2000, D 4000 and Jeffamin ED 600, ED 900, ED 2003 and DER 148) with an average weight molecular weight of between 148 and 4000 g/mol (manufacturer's data), polytetrahydrofuran diamines such as bis(3-aminopropyl)polytetrahydrofuran 350, 750, 1100 and 2100 (figures indicate the approximate molecular weight), para- and meta-xylylenediamine; 4,4-diamino-diphenylmethane, 3,3-dimethyl-4,4-diamino-diphenylmethane, isomeric phenylenediamines or isomeric xylylenediamines. Amines of the type $H_2N—R—NR—R—NH_2$ can also be used, wherein R independently denotes ($C_1$-$C_{18}$-alkyl or (C1-$C_4$)-alkoxy. One example of this is N,N'-bis-(3-aminopropyl) methylamine. The diamines can also be used as carbonate compounds, which in the condensation reaction react with the polycarboxylic acids, releasing water and eliminating $CO_2$, to form the amide groups. The stated compounds can be used separately or in mixtures.

The accordingly used carboxylic acids are preferably aliphatic, cycloaliphatic or aromatic, linear or branched, saturated or unsaturated carboxylic acids having at least 2, particularly preferably 3 to 40 carbon atoms. Examples of such polycarboxylic acids include adipic acid, oxalic acid, succinic acid, glutaric acid, pimelic acid, suberic acid, sebacic acid, azelaic acid, undecanedioic acid, 1,11-undecane dicarboxylic acid, dodecanedioic acid, hexane dicarboxylic acid, docosanedioic acid, maleic acid, fumaric acid, terephthalic acid or isophthalic acid. The acids can be used alone or in mixtures. It is also possible to use acid anhydrides such as maleic acid anhydride, glutaric acid anhydride, phthalic acid anhydride and succinic acid anhydride, which are optionally modified with alkyl groups or alkylene groups, such as, e.g., dodecenyl succinic acid anhydride. Polymeric polycarboxylic acids such as, e.g., the dicarboxylic acid of polybutadiene can also be used, along with hydroxy functional polycarboxylic acids such as, e.g., tartaric acid, citric acid and hydroxyphthalic acid. Oxydicarboxylic acids, such as 3,6,9-trioxaundecanoic acid and polyglycoldioic acid, can also be used. Dimerized fatty acids (known to a person skilled in the art as dimer acids) having a carbon chain length of 36 carbon atoms are especially preferable. These dimer acids can have both a low monomer concentration (usually <8 percent by weight) and a proportion of no more than 25 percent by weight trimer acid. The monocarboxylic acids are saturated, mono- to polyunsaturated, linear or branched carboxylic acids such as acetic acid, propionic acid, butyric acid, isobutyric acid, valeric acid, isovaleric acid, hexanoic acid, heptanoic acid, caprylic acid, perlargonic acid, capric acid, undecanoic acid, lauric acid, tridecanoic acid, myristic acid, pentadecanoic acid, palmitic acid, margaric acid, stearic acid, nonanedecanoic acid, eicosanoic acid, behenic acid, tetrocosanoic acid, hexacosanoic acid, triacontanoic acid, lauroleic acid, myristoleic acid, palmitoleic acid, petroselinic acid, oleic acid, elaidic acid, vaccenic acid, erucic acid, linoleic acid, linolenic acid, arachidonic acid, clupanodenic acid, ricinic acid, alphaelaeostearic acid, alpha-parinic acid, coconut oil fatty acid, palm kernel oil fatty acid, coconut/palm kernel oil fatty acid, palm oil fatty acid, cottonseed oil fatty acid, peanut oil fatty acid, soybean oil fatty acid, sunflower oil fatty acid, rapeseed oil fatty acid and tallow fatty acid. Ketocarboxylic acids, such as licanic acid, and aromatic monocarboxylic acids, such as, e.g., benzoic acid, may also be used accordingly. Identified examples of hydroxycarboxylic acids include, e.g., glycolic acid, 5-hydroxyvaleric acid, 6-hydroxyhexanoic acid, castor oil fatty acid, 12-hydroxystearic acid, 12-hydroxydodecanoic acid, 5-hydroxydodecanoic acid, 5-hydroxydecanoic acid and 4-hydroxydecanoic acid.

All stated carboxylic acids and anhydrides can be used separately or in mixtures.

Frequently, the compounds (B') each contain at least one linear or branched $C_{11}$-$C_{36}$ alkylene group.

Generally, the urea component (A) is present in the form of compounds (A'), each of which has a molecular weight of 500 to 300,000 and has 1 to 400 urea groups, with the proviso that the percentage by weight of each of the heteroatoms contained in the urea groups, referred to the molecular weight of the respective compound (A'), is 0.2 to 25.0% (sum of the atomic weights of the relevant heteroatoms referred to the molecular weight).

In most cases, each of the compounds (A') has a molecular weight of 500 to 60,000 and has 2 to 150 of the urea groups, with the proviso that the percentage by weight of each of the heteroatoms contained in the urea groups, referred to the molecular weight of the respective compound (A'), is 2 to 25% (sum of the atomic weights of the relevant heteroatoms referred to the molecular weight).

The urea groups of the compounds A' can be obtained, for example, by bringing aliphatic, cycloaliphatic, aromatic or arylaliphatic mono-, di- or polyisocyanates to reaction, alone or in mixtures, with suitable mono- or diamines in such a way that at least two urea groups form per molecule.

Special examples of such diisocyanates are 1,4-tetramethylene diisocyanate, 1,6-hexamethylene diisocyanate, 2,2,4-trimethyl-1,6-hexamethylene diisocyanate, 1,10-decamethylene diisocyanate, 1,4-cyclohexane diisocyanate, isophorone diisocyanate, p-phenylene diisocyanate, m-phenylene diisocyanate, 2,6-toluene diisocyanate, 2,4-toluene diisocyanate and mixtures thereof, p- and m-xylylene diisocyanate, 4,4'-diisocyanato dicyclohexylmethane, 3,3'-dimethyl-4,4'-bisphenylene diisocyanate, 3,3'-dimethyl-diisocyanato dicyclohexylmethane, the isomeric mixtures 2,4'- and 4,4'-diisocyanato diphenylmethane and 036-dimer diisocyanate. Preferred isocyanates are the biuret dimers and the isocyanurate trimers of the aforementioned diisocyanates. Particularly preferred isocyanates are hexamethylene-1,6-diisocyanate, 2,6-toluene diisocyanate and/or 2,4-toluene diisocyanate and mixtures thereof, biuret dimers thereof and/or isocyanurate trimers thereof. In a further embodiment, the polyisocyanates are polyisocyanate prepolymers with urethane structural units, which are obtained by the conversion of polyols with a stoichiometric surplus of the above-mentioned polyisocyanates. Suitable polyols are, e.g., simple diols, triols, polyalkylene oxides or polyester polyols.

Examples of simple diols and triols are ethylene glycol, propylene glycol, 1,2-butanediol, 1,4-butanediol, 1,3-butanediol, 1,5-pentanediol, dipropylene glycol or trimethylol propane. Suitable polyalkylene oxides are, e.g., polyethylene glycols, polypropylene glycols, polybutylene glycols, polytetrahydrofurandiols, and polymers of mixed alkylene oxides, such as, e.g., polyoxyethylene-polyoxypropylene glycols, wherein the alkylene oxides can be present randomly or in block form. In addition to the polyether diols, polyester diols can also be used, which are produced by the ring-opening polymerization of lactones, such as, e.g., e-caprolactone and/or d-valerolactone.

The monoisocyanates are preferably selected from aliphatic, cycloaliphatic, aromatic or arylaliphatic monoisocyanates, which can be saturated or unsaturated. The monoisocyanate preferably contains no ethylenically unsaturated double bonds. Examples are cyclohexyl isocyanate, phenyl isocyanate, n-propyl isocyanate, n-hexyl isocyanate, stearyl isocyanate, 2-isocyanato propane, m-tolyl isocyanate, p-tolyl isocyanate, benzyl isocyanate, 2-ethylphenyl isocyanate, 1-naphthyl isocyanate or 2-naphthyl isocyanate are used. Particularly preferred are $C_5$-$C_{12}$-arylene-urethane monoisocyanates, particularly toluoyleneurethane monoisocyanates, as are described in EP-A 1 188 779. All of these isocyanate-containing compounds can be used separately or in mixtures.

Frequently, the compounds (A') each have at least one ester group and/or ether group.

Binding agents that are suitable for coatings are to be understood as the non-volatile fractions of the coating preparation—without any pigments/filler materials that may be present. Suitable binding agent components (C') are, e.g., acrylate resins, methacrylate resins, (saturated and unsaturated) polyester resins, melamine resins, epoxide resins, alkyd resins and polyisocyanates. However, hydraulic inorganic binding agents, such as concrete, are not suitable for the field of coatings, and therefore are not to be considered as binding agent components (C').

Frequently, the binding agent component (C) is present in the form of non-volatile organic oligomers (C') and/or organic polymers (C'').

Generally, the organic oliogomers (C') and the organic polymers (C'') are suitable as binding agents for baking varnishes. Baking varnishes contain binding agents, which are dried and/or baked under the influence of heat, i.e., are thermally cured. In most cases, temperatures of 80 to 200° C. are required for thermal curing reactions to take place. "Baking" is understood as a hardening process in which the curing of the binding agent (and therefore the hardening) requires a system-based minimum temperature and minimum amount of time.

In a preferred embodiment of the invention, the coating preparation contains 0.1 to 80.0 wt % solvent component (D).

The solvents chosen for the solvent component (D) for coatings dissolve the binding agent and/or components of the binding agent, and also volatilize under drying/curing conditions. Particularly preferably, solvent species are expediently selected which are at least largely (or better, completely) chemically inert in relation to components (A), (B) and (C) in the coating preparation, and preferably at least largely do not (or better, do not at all) react with the stated components, even during the curing of the coating preparation. Correspondingly possible species of solvents are readily known to a person skilled in the art. As solvent component (D), the groups of substances or solvent species/solvent mixtures known to a person skilled in the art, such as esters (e.g., ethyl acetate), ketones (e.g., acetone), aromatics (e.g., toluene), aliphatics (e.g., hexane), alcohols (e.g., isopropanol) and/or glycol ether are typically used, alone or as a mixture.

Therefore, the solvent component (D) is normally present in the form of volatile inorganic and/or organic molecules (D').

The coating preparation can contain hydrogenated castor oil and/or lithium salts, particularly LiCl, and/or ionic liquids. The coating preparation can also contain additional (typical) coating additives, such as UV-absorbers and/or defoaming agents.

The coating preparation can contain 0.1 to 75 wt % a pigment/filler material component (E). The pigment/filler material component (E) is composed of non-volatile inorganic and/or organic compounds which are suitable as pigments and/or filler materials for coatings.

Pigments are coloring agents that consist of fine particles, which are insoluble in the liquid phase of the coating preparation and are used based upon their optical, protective and/or decorative properties. A filler material, in contrast, is a granular or powdered material, which is also insoluble in the liquid phase of the coating preparation, and is used for the purpose of achieving or improving specific physical properties. Frequently used pigments are, e.g., titanium dioxide, soot, iron oxides, ultramarine pigments, phthalocyanine pigments, metal effect pigments and pearl gloss pigments.

Most filler materials are relatively cost-effective substances, which are admixed to coating preparations, e.g., in order to improve the possible industrial uses and/or the quality thereof. Typical filler materials for coating preparations are, e.g., barium sulfate, calcium carbonate, talc, mica, aluminum hydroxide, silicon dioxide, and nanoparticles, e.g., those based upon silicon dioxide, aluminum oxide or zirconium oxide.

Frequently, however, the coating preparation is free of pigments and filler materials, and is used for producing varnishes. Varnishes are coating agents which, when applied to a substrate, form a transparent coating that has protective, decorative, or specific technical properties.

The coating preparation according to the invention can be applied by means of customary application methods, such as spraying, doctoring, brushing, pouring, dipping, impregnating or rolling. Preferably, spray application methods are used, such as pneumatic spray application, electrostatic spray application (ESTA), optionally combined with hot spray application (e.g. hot-air spraying).

The applied coating preparation can be cured after a certain period of rest (flashing off). The rest period is intended, for example, for flowout and for degasing of the coating layer, or for vaporizing volatile constituents such as solvents. The rest period can be supported by the application of elevated temperatures and/or by reduced humidity, and/or can be shortened, as long as this does not cause any damage or changes to the coating layer (such as a complete premature curing).

In one preferred embodiment of the invention, the coating preparation can be thermally cured. The thermal curing of the coating agent does not involve any special methods, and is instead carried out according to customary and known methods such as heating in a convection furnace or irradiating with IR lamps. Thermal curing can also be carried out in stages. Advantageously, thermal curing is carried out at a temperature of 30 to 200° C., particularly preferably at 40 to 190° C. and especially at 50 to 180° C., over a period of 1 minute up to 10 hours, wherein at the temperatures used for automobile paint refinishing, which preferably lie between 30 and 90° C., even longer curing times can be used.

Therefore, the present invention also relates to a coated substrate, which can be obtained by thermal treatment of a coating preparation that has been applied to the substrate, which is described above. In practical terms, thermal treatment is frequently carried out by means of forced-air drying at a temperature below 80° C. and/or by baking within a temperature range of 80 to 200° C.

Frequently, the substrate is present in the form of a (preferably metallic) machine element. The machine element can relate to the bodies of modes of transportation (more particularly, motor vehicles, such as motorcycles, automobiles, trucks, buses) or parts thereof. The coating preparation according to the invention is typically used in the field of general industrial coatings and/or anti-corrosion coatings (machine coatings, rail vehicles, construction machinery, agricultural machinery, ships, containers, etc.), and for packaging, coils, appliances, films, for optical, electrotechnical and mechanical components, and for articles of everyday use.

In what follows, the invention will be specified in greater detail in reference to examples.

Specifically, the advantages in terms of the application of various coating preparations according to the invention in relation to known coating preparations (not according to the invention) are described. Significant aspects in this connection are: sagging behavior during application, effect on turbidity in the varnish, effect on gloss and haze of the coating, and effect on the stability in storage of a pigmented coating.

Test Systems:

As test systems, four different coating systems having an acrylate-melamine, a polyester-melamine, or a two-component polyurethane base were used, which are used as coatings and are hereinafter referred to as coating.

Formulation 1:
Base: Acrylate/Melamine Baking Varnish

| | |
|---|---|
| Setal ® 1756 VV 65 | 60.0 g |
| Setamine ® US 138 BB 70 | 24.0 g |
| SHELLSOL A solvent | 8.0 g |
| xylene | 7.8 g |
| BYK ®-310 | 0.2 g |
| Total | 100.0 g |

Coating Production:

The individual constituents are added in succession at room temperature with stirring, and at a rate of 2 m/s, using the Dispermat CV with a toothed disk, and are then stirred another 10 minutes to ensure homogenization.

Raw Materials:
Setal®1756 VV-65: acrylate binding agent, 65% in Solvesso 100, Nuplex Resins B.V.
Setamine® US 138 BB 70: melamine binding agent, 70% in 1-butanol, Nuplex Resins B.V.
SHELLSOL A solvent: aromatic hydrocarbon C9-C10, Overlack AG
BYK®-310: 25% solution of a polyester-modified poly-dimethylsiloxane, BYK Chemie GmbH Processing:
Viscosity adjustment: 30 s DIN4 flow cup at 23° C.
Dilution: SHELLSOL A solvent/xylene 1:1
Application: pneumatic spray coating
Drying: 15 min, at 23° C., 25 min. at 140° C.

Formulation 2:
Base: Polyester/Melamine Baking Varnish

| | |
|---|---|
| Setal ® 1715 VX 74 | 52.0 g |
| Setamine ® US 138 BB 70 | 24.0 g |
| SHELLSOL A solvent | 6.0 g |
| Solvesso 150 | 6.0 g |
| Xylene | 6.0 g |
| Isobutanol | 6.0 g |
| Total | 100.0 g |

Coating Production:

The individual constituents are added in succession at room temperature with stirring, and at a rate of 2 m/s, using the Dispermat CV with a toothed disk, and are then stirred another 10 minutes to ensure homogenization.

Raw Materials:
Setal® 1715 VX-74: acrylate binding agent, 72% in Solvesso 100/xylene 7525, Nuplex Resins B.V.
Setamine® US 138 BB 70: melamine binding agent, 70% in 1-butanol Nuplex Resins B.V.
SHELLSOL A solvent: aromatic hydrocarbon C9-C10, Overlack AG
Solvesso 150: aromatic hydrocarbon C10-C11, Overlack AG Processing:
Viscosity adjustment: 30 s DIN4 flow cup at 23° C.
Dilution: SHELLSOL A solvent
Application: electrostatic spray coating
Drying: 15 min. at 23° C., 20 min. at 140° C.

Formulation 3:
Base: Two-Component Polyurethane Coating

| | |
|---|---|
| Setalux ® 1756 VV 65 | 67.2 g |
| Tinstab BL 277 | 0.7 g |
| BYK ®-331 | 0.1 g |
| BYK ®-306 | 0.3 g |
| SHELLSOL A solvent | 4.9 g |
| Desmodur ® N3390 BA/SN | 12.9 g |
| Vestanat ® T1890-E | 7.0 g |
| Dowanol MPA | 6.6 g |
| Total | 100.0 g |

Coating Production:

The individual constituents are added in succession at room temperature with stirring, and at a rate of 2 m/s, using the Dispermat CV with a toothed disk, and are then stirred another 10 minutes to ensure homogenization.

Raw Materials:
Setalux® 1756 VV-65: acrylate binding agent, 65% in Solvesso 100, Nuplex Resins B.V.
Tinstab BL 277: dibutyltin dilaurate, Overlack AG
BYK®-331: 100% polyether-modified polydimethyl-siloxane, BYK Chemie GmbH
BYK®-306: 12.5% solution of a polyether-modified polydimethylsiloxane in xylene/monophenyl glycol 7/2, BYK-Chemie GmbH
SHELLSOL A solvent aromatic hydrocarbon C9-C10, Overlack AG
Desmodur® N3390 BA/SN: aliphatic polyisocyanate, 90% in butyl acetate/Solvesso 100 1:1, Bayer Material Science AG
Vestanat® T1890-E: cylcoaliphatic polyisocyanate, 70% in butyl acetate/Solvesso 100 1:2, Evonik Industries AG
Dowanol MPA: 1-methoxypropyl acetate, Overlack AG Processing:
Viscosity adjustment: 30 s DIN4 flow cup at 23° C.
Dilution: SHELLSOL A solvent
Application: electrostatic spray coating
Drying: 10 min, at 23° C., 60 min. at 80° C.

Formulation 4:
Aluminum Pigmented Polyester-Melamine Base Coat Paint

| | |
|---|---|
| Setal ® 189 XX-65 | 50.0 g |
| Setamine ® US 138 BB 70 | 12.3 g |
| CAB 381.05 solution (25% in butyl acetate) * | 15.0 g |
| Aluminum slurry ** | 10.0 g |
| Butyl acetate | 12.4 g |
| BYK ®-315 | 0.3 g |
| Total | 100.0 g |

CAB Solution *

| | |
|---|---|
| Butyl acetate | 75.0 g |
| CAB 381.05 | 25.0 g |
| Total | 100.0 g |

The 25% partial dissolution of the CAB powder in butyl acetate is accomplished by adding the CAB to the prepared butyl acetate at room temperature over a period of 30 minutes with stirring using the Dispermat CV with a toothed disk, at a rate of 5 m/s.

Aluminum Slurry **

| | | |
|---|---|---|
| 1 STAPA ® METALLUX 2152 | 50.0 g | premix |
| 2 DIS ®-110 | 1.2 g | |
| 3 Butyl acetate | 22.8 g | |
| 4 Butyl acetate | 21.0 g | |
| 5 n-butanol | 5.0 g | |
| Total | 100.0 g | |

The aluminum slurry is produced by premixing raw materials 1 to 3 at room temperature using the Dispermat CV with a toothed disk at a rate of 2 m/s, and then metering in raw materials 4 and 5. To ensure a complete curing of the aluminum pigment, the slurry is stirred another 10 minutes.

Coating Production:

To produce the coating, the individual constituents are added in succession at room temperature with stirring using the Dispermat CV with a toothed disk, at a rate of 2 m/s, and are then stirred an additional 10 minutes to ensure homogenization.

Raw Materials:

Setal® 189 XX-65: polyester binding agent, 65% in xylene, Nuplex Resins B.V.

Setamine® US 138 BB 70: melamine binding agent, 70% in 1-butanol, Nuplex Resins B.V.

CAB 381.05: cellulose-acetate-butyrate, 100%, Eastman Chemical B.V.

BYK®-315: 25% solution of a polyester-modified polymethylalkylsiloxane in methoxypropyl acetate/phenoxyethanol 1/1, BYK Chemie GmbH STAPA® METALLUX 2152: 75% aluminum paste in test benzine/solvent naphtha 1:1, Eckart GmbH DIS®-110: 52% solution of a copolymer with acid groups in methoxypropyl acetate/alkylbenzenes 1/1, BYK Chemie GmbH Known rheology control agent (not according to the invention):

BYK-®405: 52% solution of polyhydroxycarboxylic acid amides in xylene/alkylbenzenes/isobutanol 5/4/1, BYK Chemie GmbH BYK-®410: 52% solution of a modified urea in N-methylpyrrolidone, BYK Chemie GmbH BYK®-430: 30% solution of a high-molecular weight urea modified polyamide in isobutanol/solvent naptha 9/1, BYK Chemie GmbH Polymeric urea: 30% solution of a modified polyurea in dimethyl sulfoxide, BYK Chemie GmbH Aerosil® R972: hydrophobic pyrogenic silicic acid, 100%, Evonik Industries AG Polymeric Urea (Method of Production):

First, a monoadduct, as is described in EP-A 1 188 779, is produced from a mixture of 2,4-toluoylene diisocyanate and 2,6-toluoylene diisocyanate (Desmodur T80, Bayer AG) and butoxypolyalkylene glycol (polyglycol B11/50, Clariant).

In a reaction vessel, 3.8 g (0.09 mol) LiCl are dissolved with stirring in 146.3 g dimethyl sulfoxide. 10.3 g (0.075 mol) meta-xylylenediamine are then added, and the clear mixture is heated to 60° C. A mixture of 10.4 g (0.06 mol) Desmodur T65 (mixture of 2,4-toluoylene-diisocyanate and 2,6-toluoylene diisocyanate, Bayer AG) and 38.2 g (0.03 mol) of the monoadduct of Desmodur T80 and butoxypolyalkylene glycol is then added dropwise with stirring over a period of 1 hour, so that the temperature does not exceed 65° C. To complete the reaction, the reaction mixture is stirred for 3 hours at 60° C. A clear, colorless and liquid product is obtained.

Test for Sagging Limit:

To analyze the effect on the sagging behavior of coatings, the rheology control agents, with the exception of Aerosil® R972, are incorporated into the test systems for 2 min. at room temperature with stirring, using a Dispermat CV with a toothed disk, at a rate of 2 m/s. The powdered Aerosil® R972 is incorporated for 30 min. at a rate of 18 m/s using a Dispermat CV with a Teflon disk and 1 mm glass beads (coating: beads 1:1) in a double-walled Dispermat pot at 20° C. One day after incorporation, the coatings are diluted using the DIN4 cup to a sagging time of 30 s (DIN EN ISO 2431). The coating is then applied, as indicated in the formulation, by means of electrostatic or pneumatic spray application, in a wedge pattern to vertically suspended, primed perforated sheets (steel 30×50 cm), producing a dry coating thickness of 10-50 μm. The subsequent flashing off of the coating sheets and the drying by baking and/or by forced-air drying in the convection furnace are also carried out with the sheets in a vertical position. The sagging behavior is analyzed by visual assessment once the coating is fully dried. The higher the sagging limit, the better the rheological efficacy of the rheology control agent, i.e. the greater the layer thickness of the coating that can be applied to vertical surfaces. The dry coating thickness is determined using the Byko Test 1500, from BYK-Gardner, according to DIN EN ISO 2178. The results are summarized in Table 1.

TABLE 1

| Additive | Sagging limit/μm dry Formulation | | |
|---|---|---|---|
| (1 wt % active substance referred to the total) | 1 | 2 | 3 |
| Control sample | 16 | 17 | 19 |
| Polymeric urea/BYK ®-430 7:3 | 36 | 40 | 28 |
| Polymeric urea/BYK ®-430 5:5 | 33 | 37 | 26 |
| Polymeric urea | 23 | 21 | 23 |
| BYK ®-430 | 20 | 20 | 23 |
| BYK ®-410 | 28 | 26 | 17 |
| Aerosil ® R972 | 24 | 20 | 22 |
| Aerosil ® R972 + BYK ®-405 * | 30 | 23 | 22 |

* 40% delivered form referred to Aerosil

Test for Compatibility:

For this test, the rheology control agents, with the exception of Aerosil® R972, are incorporated into 3 different varnishes at room temperature for 2 min. with stirring using a Dispermat CV with a toothed disk at a rate of 2 m/s. The powdered Aerosil® R972 is incorporated for 30 min. at a rate of 18 m/s using a Dispermat CV with a Teflon disk and 1 mm glass beads (coating:beads 1:1) in a double-walled Dispermat pot at 20° C. The assessment of the effect of the rheology control agent on the turbidity of the wet coating is carried out 1 day after the incorporation. The less significant the effect on turbidity, the better the compatibility of the rheology control agent in the coating system. The assessment is carried out visually, using a scale of 1–5 (1=clear to 5=highly turbid) and is summarized in Table 2.

TABLE 2

| Additive (1 wt % active substance referred to the total) | Turbidity in the wet coating | | |
|---|---|---|---|
| | Formulation 1 | Formulation 2 | Formulation 3 |
| Control sample | 1 | 1 | 1 |
| Polymeric urea/BYK ®-430 9:1 | 1 | 1 | 1 |
| Polymeric urea/BYK ®-430 8:2 | 2 | 1 | 2 |
| Polymeric urea/BYK ®-430 7:3 | 2 | 2 | 2 |
| Polymeric urea/BYK ®-430 5:5 | 3 | 3 | 3 |
| BYK ®-430 | 4 * | 4 * | 4 |
| Aerosil ® R972 | 4 | 4 | 4 |

* coagulation

Test for Effect on Gloss and/or Haze:

To analyze the effect of the rheology control agents on the gloss and haze of varnish coatings, the rheology control agents, with the exception of Aerosil® R972, are incorporated into the test systems at room temperature for 2 min., with stirring, using a Dispermat CV with a toothed disk, at a rate of 2 m/s. The powdered Aerosil® R972 is incorporated for 30 min. at a rate of 18 m/s using a Dispermat CV with a Teflon disk and 1 mm glass beads (coating:beads 1:1) in a double-walled Dispermat pot at 20° C. One day after incorporation, the coatings are diluted using the DIN4 cup to a sagging time of 30 s (DIN EN ISO 2431). Application is carried out, as indicated in the formulation, by means of electrostatic and/or pneumatic spray application. Application is to primed steel sheets (30×50 cm), producing a dry coating thickness of 35 μm. Application is carried out with the sheet in a vertical position, flashing off and subsequent baking and/or forced-air drying are carried out with the substrate in a horizontal position. The gloss and/or haze are determined 1 day after application using the Haze-Gloss, from BYK-Gardner, according to DIN 67530. The higher the values for gloss and haze, the better the compatibility of the rheology control agent. The results are summarized in Tables 3 and 4.

TABLE 3

Formulation 2: polyester/melamine baking varnish

| Additive (1 wt % active substance referred to the total) | Gloss 20° | Haze |
|---|---|---|
| Control sample | 87 | 20 |
| Polymeric urea/BYK ®-430 7:3 | 88 | 15 |
| Polymeric urea/BYK ®-430 5:5 | 88 | 18 |
| Polymeric urea/BYK ®-430 3:7 | 86 | 25 |
| Polymeric urea | 84 | 54 |
| BYK ®-430 | 74 | 155 |
| Aerosil ® R972 | 85 | 30 |
| Aerosil ® R972 + BYK ®-405 * | 84 | 40 |

* 40% delivered form referred to Aerosil

TABLE 4

Formulation 1: acrylate/melamine baking varnish

| Additive (1 wt % active substance referred to the total) | Gloss 20° | Haze |
|---|---|---|
| Control sample | 95 | 17 |
| Polymeric urea/BYK ®-430 8:2 | 95 | 17 |
| Polymeric urea/BYK ®-430 7:3 | 95 | 18 |
| Polymeric urea/BYK ®-430 6:4 | 93 | 25 |
| Polymeric urea/BYK ®-430 5:5 | 90 | 35 |
| Polymeric urea/BYK ®-430 3:7 | 85 | 70 |
| BYK ®-430 | 77 | 182 |
| Aerosil ® R972 + BYK ®-405 * | 81 | 144 |

* 40% delivered form referred to Aerosil

Test for Effect on Stability in Storage:

The analysis of the effect of the rheology control agent on stability in storage is carried out in an aluminum pigmented automobile base coat paint. The various rheology control agents are incorporated into the finished coating formulation, immediately after production, at room temperature for 2 minutes with stirring using the Dispermat CV with a toothed disk at a rate of 2 m/s. The analysis of stability in storage is carried out by storing at room temperature (23° C.) and at 50° C. in the convection furnace for a period of 4 days in 50 ml glass flasks.

When storage has been completed, the samples are analyzed visually for sedimentation and a tendency toward syneresis. Sedimentation is evaluated sensorially using a spatula. The tendency toward syneresis is measured using a ruler and is indicated as a percentage referred to the total sample height. Good stability in storage provided by the rheology control agent is achieved when the pigment remains as homogeneously dispersed as possible, regardless of the storage temperature, in other words, the tendency toward syneresis is minimized. The results are summarized in Table 5.

TABLE 5

Formulation 4: aluminum pigmented automobile base coat paint

| Additive (0.8 wt % active substance referred to the total) | Syneresis/% after 4 days at 23° C. | Syneresis/% after 4 days at 50° C. |
|---|---|---|
| Control sample | 88 | 93 |
| BYK- ®430 | 28 | 88 |
| Polymeric urea | 73 | 56 |
| Polymeric urea/BYK ®-430 7:3 | 35 | 33 |

All samples show no solid sedimentation; the control sample can also be easily stirred up.

The results of the above experiment examples support the advantages in terms of application of the coating preparation according to the invention over known (not according to the invention) coating preparations, because the corresponding (provided according to the invention) urea/polyamide combination, on the one hand, has a positive effect on stability and, on the other hand, causes the lowest tendency toward turbidity in the varnish. The optical properties of the coating, such as gloss and haze, are also influenced least by the corresponding urea/polyamide combination, which, in addition to the influence on turbidity in the varnish, is a clear indication of the excellent compatibility. The stability in storage of the pigmented coating was also improved the most by the corresponding urea/polyamide combination (stored at 50° C.). In addition to the positive result with respect to the stability of the baking varnish, this is a further indication of the temperature-insensitive action of the corresponding urea/polyamide combination.

The invention claimed is:

1. A coating preparation containing
   i) 0.1 to 9.0 wt % of a urea component (A),
   ii) 0.1 to 5.0 wt % of an amide component (B),
   iii) 10.0 to 90.0 wt % of a binding agent component (C) that is different from both the urea component (A) and the amide component (B), and
   iv) 0 to 85.0 wt % of a solvent component (D),
   wherein the urea component comprises the reaction product of a monoadduct of 2,4-toluylene diisocyanate, 2,6-toluylene diisocyanate, and butoxypolyalkylene glycol; meta-xylylenediamine; and a mixture of 2,4-toluylene diisocyanate and 2,6-toluylene diisocyanate; and wherein the amide component comprises a high molecular weight urea modified polar polyamide;
   wherein the sum of the urea component (A) and the amide component (B) fractions is 0.3 to 10.0 wt % and the sum of the binding component (C) and the solvent component (D) fractions is 80.0 to 99.7 wt %, the amide component (B) is present in the form of compounds (B'), each of which has a molecular weight of 300 to 50,000 and has 2 to 300 amide groups, with the proviso that, the percentage by weight of each of the heteroatoms contained in the amide groups, referred to the molecular weight of the respective compound (B'), is 0.2 to 25.0%, and at least one hydrogen atom is bonded to each of the nitrogen atoms of the amide groups, and the binding agent component (C) is present in the form of non-volatile organic oligomers (C') and/or organic polymers (C").

2. The coating preparation according to claim 1, wherein the sum of the urea component (A) and the amide component (B) fractions is 0.4 to 6 wt %, and the sum of the binding agent component (C) and the solvent component (D) fractions is 85.0 to 99.5 wt %.

3. The coating preparation according to claim 1, wherein each of the compounds (B') has a molecular weight of 300 to 30,000 and has 2 to 150 amide groups, with the proviso that the percentage by weight of each of the heteroatoms contained in the amide groups, referred to the molecular weight of the respective compound (B'), is 2 to 20.0%, and at least one hydrogen atom is bonded to each of the nitrogen atoms of the amide groups.

4. The coating preparation according to claim 1, wherein each of the compounds (B') contains at least one linear or branched $C_{11}$-$C_{36}$ alkylene group.

5. The coating preparation according to claim 1, wherein the urea component (A) is present in the form of compounds (A'), each of which has a molecular weight of 500 to 300,000 and has 1 to 400 urea groups, with the proviso that the percentage by weight of each of the heteroatoms contained in the urea groups, referred to the molecular weight of the respective compound (A'), is 0.2 to 25.0%.

6. The coating preparation according to claim 5, wherein each of the compounds (A') has a molecular weight of 500 to 60,000 and has 2 to 150 of the urea groups, with the proviso that the percentage by weight of each of the heteroatoms contained in the urea groups, referred to the molecular weight of the respective compound (A'), is 2 to 25%.

7. The coating preparation according to claim 5, wherein each of the compounds (A') has at least one ester group and/or ether group.

8. The coating preparation according to claim 1, wherein the organic oligomers (C') and the organic polymers (C") are suitable as binding agents for baking varnishes.

9. The coating preparation according to claim 1, wherein the solvent component (D) is present in the form of volatile inorganic and/or organic molecules (D').

10. The coating preparation according to claim 1, containing hydrogenated castor oil and/or lithium salts, optionally LiCl, and/or ionic liquids.

11. The coating preparation according to claim 1, containing iv) 0.1 to 80.0 wt % of the solvent component (D).

12. The coating preparation according to claim 1, containing v) 0.1 to 75 wt % of a pigment component/filler material component (E).

13. The coating preparation according to claim 1, which can be thermally cured.

14. A coated substrate which can be obtained by the thermal treatment of the coating preparation according to claim 1 applied to the substrate.

15. The coated substrate according to claim 14, wherein the thermal treatment is carried out by forced-air drying at a temperature below 80° C. and/or baking within a temperature range of 80 to 200° C.

16. The coated substrate according to claim 14, wherein the substrate is present in the form of a machine element.

17. The coating preparation according to claim 1, wherein the sum of the urea component (A) and the amide component (B) fractions is 0.5 to 2.0 wt %, and the sum of the binding agent component (C) and the solvent component (D) fractions is 90.0 to 99.5 wt %.

18. The coating preparation according to claim 1 wherein the ratio of the urea component to the amide component is in the range of 9:1 to 3:7.

* * * * *